(12) United States Patent
Tachwali (10) Patent No.: US 11,567,212 B2
(45) Date of Patent: Jan. 31, 2023

(54) COMPRESSIVE SENSING FOR PHOTODIODE DATA

(71) Applicant: Argo AI, LLC, Pittsburgh, PA (US)

(72) Inventor: Yahia Tachwali, Princeton, NJ (US)

(73) Assignee: ARGO AI, LLC, Pittsburgh, PA (US)

( * ) Notice: Subject to any disclaimer, the term of this patent is extended or adjusted under 35 U.S.C. 154(b) by 170 days.

(21) Appl. No.: 17/201,901

(22) Filed: Mar. 15, 2021

(65) Prior Publication Data

US 2022/0291388 A1 Sep. 15, 2022

(51) Int. Cl.
| | |
|---|---|
| G01S 17/931 | (2020.01) |
| G01S 7/486 | (2020.01) |
| G01S 7/484 | (2006.01) |
| G01S 17/89 | (2020.01) |

(52) U.S. Cl.
CPC ............ *G01S 17/931* (2020.01); *G01S 7/484* (2013.01); *G01S 7/486* (2013.01); *G01S 17/89* (2013.01)

(58) Field of Classification Search
CPC ........ G01S 17/931; G01S 7/484; G01S 7/486; G01S 17/89
See application file for complete search history.

(56) References Cited

U.S. PATENT DOCUMENTS

| | | | |
|---|---|---|---|
| 8,670,591 | B2 | 3/2014 | Mendez-Rodriguez et al. |
| 9,213,085 | B2 | 12/2015 | Kanter |
| 10,571,569 | B2 | 2/2020 | Montoya et al. |
| 2017/0350983 | A1 | 12/2017 | Hall et al. |
| 2018/0172806 | A1 | 6/2018 | Marron |
| 2019/0187284 | A1 | 6/2019 | Raring et al. |
| 2019/0331774 | A1 | 10/2019 | Jackson |

(Continued)

FOREIGN PATENT DOCUMENTS

| | | | | |
|---|---|---|---|---|
| CN | 102608619 A | | 7/2012 | |
| CN | 113795773 A | * | 12/2021 | ............ G01S 17/10 |

(Continued)

OTHER PUBLICATIONS

An et al. "Compressive Sensing Based Three-Dimensional Imaging Method with Electro-Optic Modulation for Monscanning Laser Radar", Symmetry, May 6, 2020, pp. 1-20, vol. 12, MDPI, Basel, Switzerland.

(Continued)

*Primary Examiner* — Ig T An
(74) *Attorney, Agent, or Firm* — Sterne, Kessler, Goldstein & Fox P.L.L.C.

(57) ABSTRACT

Devices, systems, and methods are provided for compressive sensing using photodiode data. A device may identify light detecting and ranging (LIDAR) data detected by a sensor, the LIDAR data including a first time-of-flight (ToF) and a second ToF. The device may generate, based on the first ToF, a first frequency value. The device may generate, based on the second ToF, a second frequency value. The device may generate, based on the first value, a first sinusoid. The device may generate, based on the second value, a second sinusoid. The device may generate, based on the first sinusoid and the second sinusoid, a compressed signal in a domain incoherent with the time domain. The device may extract range information based on the compressed signal, and may control operation of a vehicle based on the range information.

20 Claims, 5 Drawing Sheets

(56) References Cited

U.S. PATENT DOCUMENTS

| | | |
|---|---|---|
| 2020/0284883 A1 | 9/2020 | Ferreira et al. |
| 2021/0405194 A1 | 12/2021 | Tsuchida |
| 2022/0026920 A1* | 1/2022 | Ebrahimi Afrouzi ........................ G05D 1/0044 |
| 2022/0276351 A1* | 9/2022 | Ferreira ................ G01S 17/894 |

FOREIGN PATENT DOCUMENTS

| | | |
|---|---|---|
| CN | 114488189 A * | 5/2022 |
| WO | WO 2020-110779 | 6/2020 |
| WO | WO 2020-210276 A1 | 10/2020 |

OTHER PUBLICATIONS

Howland et al. "Photon Counting Compressive Depth Mapping", Optics Express, Oct. 7, 2013, pp. 1-17, vol. 21, issue 20, ResearchGate, Bedin, Germany.

Kang et al. "Fast Long-Range Photon Counting Depth Imaging With Sparse Single-Photon Data", IEEE Photonics Journal, Jun. 2018, pp. 1-11, vol. 10, issue 3, IEEE, New York, NY.

International Search Report and Written Opinion of the International Searching Authority directed to related International Patent Application No. PCT/US2022/020216, dated Jun. 29, 2022; 9 pages.

\* cited by examiner

COMPRESSIVE SENSING FOR PHOTODIODE DATA

TECHNICAL FIELD

This disclosure generally relates to systems, methods, and devices for using sensor data.

BACKGROUND

Some vehicles are equipped with a sensor system to collect data relating to the current and developing state of the vehicle's surroundings. The proper performance of a vehicle depends on the accuracy data collected by the sensors in the sensor system.

However, sparse signal samples may result in inaccurate signal processing.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include light detection and ranging (LIDAR) sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, sensors such as LIDAR rely on accurate detection of signals reflected from objects in the vicinity of the autonomous vehicle. LIDAR sensors may use photodiodes, such as avalanche photodiodes (APDs), and Geiger mode APDs (GMAPDs) may provide sparse signal information.

Signal processing efficiency of sensor data, such as GMAPDs and other sensors, may be undermined when signals are sparse. For example, using a 1000-point sparse signal from which only two data points are of interest, processing the sparse signal at the rate at which the signal arrives may be inefficient.

A signal representation may be sparse when the amount of information from the signal is significantly less than the size of the signal representation. Given that LIDAR time-of-flight (ToF) histograms may be sparse signals, especially for longer-rage LIDAR sensors, sensing techniques may result in histograms with significant noise.

There is therefore a need for improved sensing techniques for photodiode data, such as LIDAR photodiodes.

In one or more embodiments, rather than processing a sparse signal at the rate at which the signal arrives, compressive sensing techniques may allow for a transformation of the sparse signal into an incoherent domain (e.g., the transfer between the sparse signal representation domain and the transformed data domain may not be linear), where compressive sensing may reduce the number of samples needed to identify the most energetic data points of the sparse signal. For example, instead of using 1000 samples of a 1000-point sparse signal to identify two data points of interest (e.g., the most energetic data points), the compressive sensing techniques may allow for the use of a smaller number of samples (e.g., 100 samples or less) of the signal data to obtain the two data points of interest (e.g., having the highest energy).

In one or more embodiments, compressive sensing techniques may provide advanced signal processing algorithms to recover a signal using a small number of samples at a rate less than Nyquist limits, for example, assuming that a signal domain is sparse. Because a LIDAR ToF histogram may be a sparse signal, compressive sensing techniques may be used to facilitate efficient construction of noiseless histograms with more data than sparse LIDAR-based signals.

In one or more embodiments, a system may transform ToF information (e.g., LIDAR pulse ToF) received from a detector into a domain that is non-sparse. In this manner, while LIDAR APD data may be sparse, particularly for long-range LIDAR, the ToF information from LIDAR signals may be transformed (e.g., using inverse fast-Fourier transform) into a non-sparse domain for signal processing (e.g., to project a sparse frequency signal, such as a N-sample signal with a non-zero sample, onto a time domain to appear as a sinusoid). Any ToF value for a LIDAR signal may correspond to a frequency value that may drive an oscillator (e.g., a numerical controlled oscillator) and may produce a fixed number of samples of a sinusoid. In this manner, rather than requiring many ToF samples with which to generate a large, sparse histogram, the processing may be faster and less resource-intensive because the sinusoids may be used to generate a recovered signal with limited data points (e.g., fewer data points than the larger, sparse histogram—representing the data points indicative of the presence of objects).

In one or more embodiments, there may be fewer data points extracted for the recovered signal because random sampling of the sinusoids with fewer samples may include less samples than the sparse signal from which the sinusoids are generated. With larger ToF data sets, the system may generate and aggregate more corresponding sinusoidal signals. The system may have a mixture of sinusoidal signals in the time domain as a result, rather than a sparse histogram, and may use compressive sensing techniques to estimate the spectrum of the sinusoids. The spectrum may represent a de-noised version of the ToF histogram. For example, with thirty emitted LIDAR pulses, the system may have thirty timestamps representing ToFs of the pulses (e.g., the time from emission of a pulse to detection of the reflected pulse back to the system). Any of the thirty ToFs may be assigned a corresponding frequency with which an oscillator may generate a sinusoid. The sinusoids may be aggregated and randomly sampled (e.g., with fewer samples than the histogram for the original ToF data). The random samples may be used by the compressed signal recovery to extract the most N energetic data points to allow for range (e.g., distance) determinations.

In one or more embodiments, the system may map any one or multiple ToFs to a corresponding frequency value. For example, a 10 nanosecond ToF may correspond to a 10 MHz frequency. The frequency values may serve as inputs to an oscillator which may generate the sinusoids based on the frequency values. The aggregated sinusoids may represent data in a domain incoherent with the domain of the ToF data. In this manner, the conversion of ToF values to sinusoids in an incoherent domain may be linear or non-linear. An APD LIDAR signal may be discrete and continuous, and may map to a frequency value used to generate data in an incoherent domain. In this manner, signal processing efficiency for a sparse signal may be improved because random sampling from the incoherent domain may not require as many samples as a histogram from the domain for sparse the ToF data. For example, a histogram for the original sparse ToF data may be generated using 1000 samples every microsecond, whereas the random sampling from the aggregated sinusoids may use only 100 random samples every microsecond.

In one or more embodiments, the system may identify the most dominant harmonics (e.g., having the most energy) of the sinusoids in the incoherent domain, and their amplitudes. For example, using a ToF data set of 5, 5, 8, 9, 9, 11, 12, 13, 15, 20 and ten samples of 10 nanoseconds, the 10 nanosecond ToFs appear multiple times and therefore may be considered dominant and most likely to be indicative of the presence of an object whose reflections of LIDAR data resulted in the 10 nanosecond ToFs. When 20 samples arrive every 1 microsecond, but the processing capacity can handle up to four samples every microsecond, for example, the result is unlikely to discover the most energetic (frequent) time stamps through four samples taken from the same domain as those time stamps (which is usually a histogram that contains those time stamps which is typically much larger in size than the number of time stamp samples e.g., 1000 bins). However, if thE timestamps are transferred to an incoherent domain, then there is a stronger chance to extract the most frequent timestamps from the reduced (e.g., four) samples if taken randomly from the incoherent domain. This is possible because each one of those samples carries some information about all the time stamps in the time domain. The process of extracting those information is the compressive recovery algorithm. As a result, it may not be necessary to execute the computation at 1000 samples (histogram) per microsecond, and instead a reduced number of samples (e.g., four samples) per microsecond may be used to identify the most energetic data points. When the most energetic data points are used for object detection to control operation of an autonomous vehicle, the identification of the most energetic data points may be crucial.

In one or more embodiments, the system may identify the most dominant harmonics (e.g., having the most energy) of the sinusoids and their amplitudes. For example, using a ToF data set of 5, 8, 10, 10, 12, and 30 nanoseconds, the 10 nanosecond ToFs appear multiple times and therefore may be considered dominant and most likely to be indicative of the presence of an object whose reflections of LIDAR data resulted in the 10 nanosecond ToFs. When a histogram of the ToF data is generated, a spike may occur at the bin for 10 nanoseconds. However, without compressed sensing, the signal processing may require a much larger sampling (e.g., 1000 or more samples) to identify a single dominant value at 10 nanoseconds. To improve the signal processing efficiency, the ToF data may be converted to a domain incoherent with the domain of the ToF data, and randomly sampled with fewer samples.

In one or more embodiments, an oscillator may generate corresponding sinusoids of the ToFs based on frequency values corresponding to the ToFs (e.g., based on a mapping between the ToFs and frequency values), and a transformed using a compressed sensing recovery method, such as Ann Arbor Fast Fourier Transform (AAFFT), Sparse Fast Fourier Transform (SFFT), Fast Fourier Aliasing-based Sparse Transform (FFAST), or the like. In this manner, signal processing efficiency of a sparse signal may be improved by using fewer, but sufficient samples to construct a de-noised spectrum or higher resolution point cloud image representative of LIDAR or other signals.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
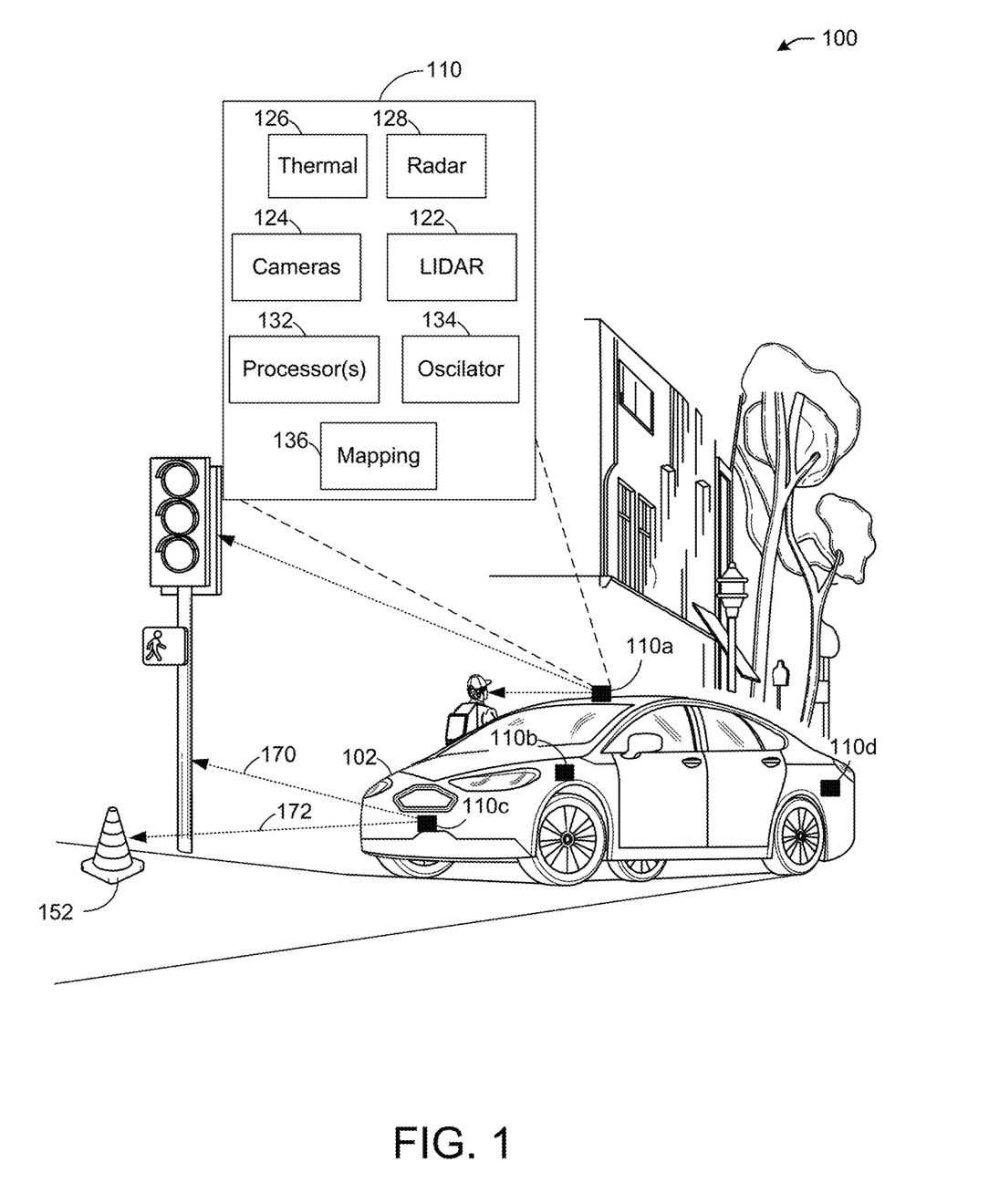
FIG. 1 illustrates an example environment of a vehicle, in accordance with one or more example embodiments of the present disclosure.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102. In this environment 100, there is shown that sensor system 110 includes sensors such as sensors 110*a*, 110*b*, 110*c*, and 110*d*. It should be noted that other sensors not shown in this figure may also be attached to the vehicle 102 and that the sensors 110*a*, 110*b*, 110*c*, and 110*d* are used for illustrative purposes. These sensors may detect objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122 (e.g., LIDAR emitters and sensors/receivers). Some examples of a LIDAR may include Geiger mode LIDAR, line-mode LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, should indicate a proper distance and shape of object 152.

In one or more embodiments, the sensor system 110 may emit multiple LIDAR pulses. The reflection of the pulses may result in return signals that may be used by the sensor system 110 to detect an object distance (e.g., the reflection of the pulses caused by the object), for example, using the time-of-flight of an emitted LIDAR pulse and the corresponding return signal.

In one or more embodiments, the sensor system 110 may include an oscillator (e.g., a numerical controlled oscillator or another type of oscillator) for generating sinusoids based on LIDAR ToF data. For example, LIDAR pulses 170 and 172 may reflect off of objects, and the sensors 110a, 110b, 110c, and 110d may detect the reflections of the LIDAR pulses (e.g., the sensors 110a, 110b, 110c, and 110d may include photodiodes, such as APDs). The sensor system 110 may determine the ToF of any LIDAR pulse (e.g., the time from emission of the LIDAR pulse 170 to detection of the reflection of the LIDAR pulse 170 at the sensor 110c). The sensor system 110 may map any ToF value (e.g., a nanoseconds value) to a corresponding frequency value. For example, the sensor system 110 may use a mapping 136 that maps ToF values to a corresponding frequency value (e.g., a ToF value of 10 nanoseconds may map to a frequency value of 10 MHz or another value, whether the mapping is linear or non-linear). The oscillator 134 may receive the frequency values and generate sinusoids (e.g., sinusoidal waveforms) based on the frequency values. For example, the oscillator 134 may include a phase accumulator and a phase-to-amplitude converter to generate a time-domain sinusoid based on a given frequency value. Using the 10 nanoseconds ToF example that maps to a 10 MHz frequency value, the oscillator 134 may generate a sinusoidal output (e.g., wave) based on the input value of 10 MHz. In this manner, using multiple ToF data points, the oscillator 134 may generate multiple sinusoidal signals in the time domain. The sinusoidal signals may be aggregated, representing data in a domain incoherent with the time domain of the ToF data. Applying a compressed signal recovery to randomly sample the data in the incoherent domain may result in fewer values than the less efficient processing of a large, sparse histogram based on the ToF values (e.g., based on a selection of the most N repeated values). De-mapping the sampled values using the mapping between ToFs and frequencies may result in ToF values and a corresponding histogram based on ToF values, but with fewer than the original ToF values because of the random sampling of the compressive signal recovery, resulting in less noise in a histogram for the ToF data than would otherwise be generated using sparse ToF data without the conversion to sinusoids.

It is understood that the above descriptions are for purposes of illustration and are not meant to be limiting.

Figure 2A:
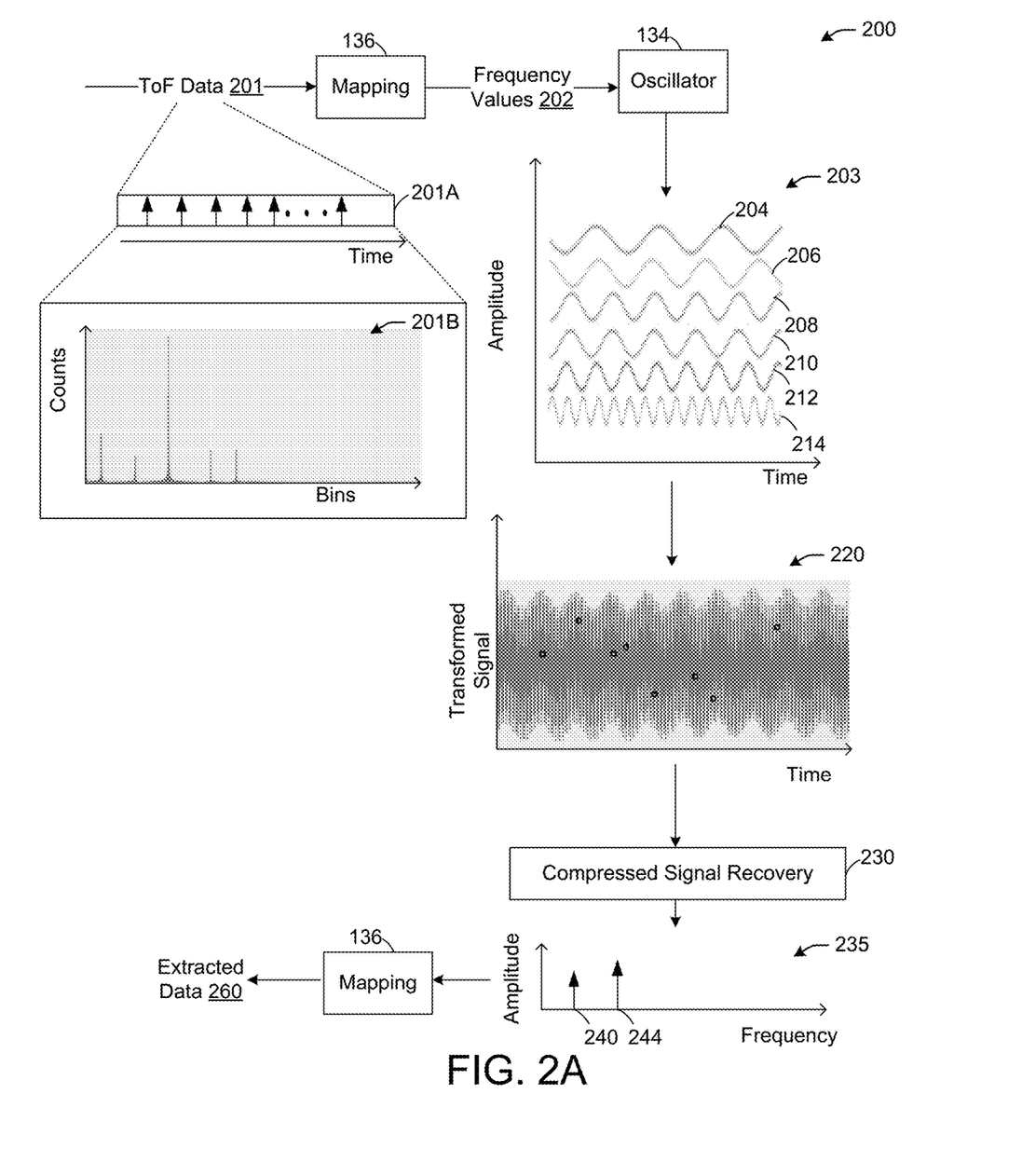
FIG. 2A depicts an illustrative process for processing light detection and ranging (LIDAR) data, in accordance with one or more example embodiments of the present disclosure.

FIG. 2A depicts an illustrative process 200 for processing light detection and ranging (LIDAR) data, in accordance with one or more example embodiments of the present disclosure.

Referring to FIG. 2A, the process 200 may include the one or more processors 132 of FIG. 1 to map ToF data 201 (e.g., individual ToF values corresponding to the time between respective LIDAR pulse emissions and respective detections of the reflections of the emitted LIDAR pulses) to frequency values 202. The ToF data 201 may represent a sparse signal 201A with only a few data points (e.g., the arrows shown in the sparse signal 201A). A histogram 201B based on the ToF data 201 does not need to be generated by the process 200, but is shown in FIG. 2A for reference. For example, the ToF data 201 may be sampled at 10000 samples per microsecond to identify the three data points shown, which is inefficient. To improve signal processing efficiency, the ToF data 201 may be converted to an incoherent domain. A mapping 136 may provide, for any ToF value of the ToF data 201, a corresponding frequency value. The mapping 136 may be linear (e.g., multiplying any ToF value by a scalar value), or non-linear (e.g., quadratic, exponential, etc.). The mapping may include a matrix for randomly projecting the frequency values 202. The number of frequency values 202 may be the same as or different than the number of ToFs in the ToF data 201. Using the frequency values 202 as inputs, an oscillator (e.g., a numerical controlled oscillator or another type of oscillator) may generate sinusoids 203 in the time domain.

Still referring to FIG. 2A, the number of sinusoids 203 may equal to the number of ToFs and frequency values 202, but may include more data points because the sinusoids 203 are waves over time. For example, given six ToF values of the ToF data 201, the frequency values 202 include six corresponding values (e.g., frequencies), and the sinusoids 203 may include a corresponding sinusoid for every frequency value 202 (e.g., six sinusoids). As shown, there are six sinusoids—sinusoid 204, sinusoid 206, sinusoid 208, sinusoid 210, sinusoid 212, and sinusoid 214, although more sinusoids may be generated when more ToF data points are detected and used to generate the sinusoids 203. As shown, the sinusoids 208 and 210 are the same, meaning that they may correspond to the same frequency value and the same ToF (e.g., two ToFs may be the same, corresponding in the same frequency values, and resulting in generation of the same sinusoids).

Figure 2B:
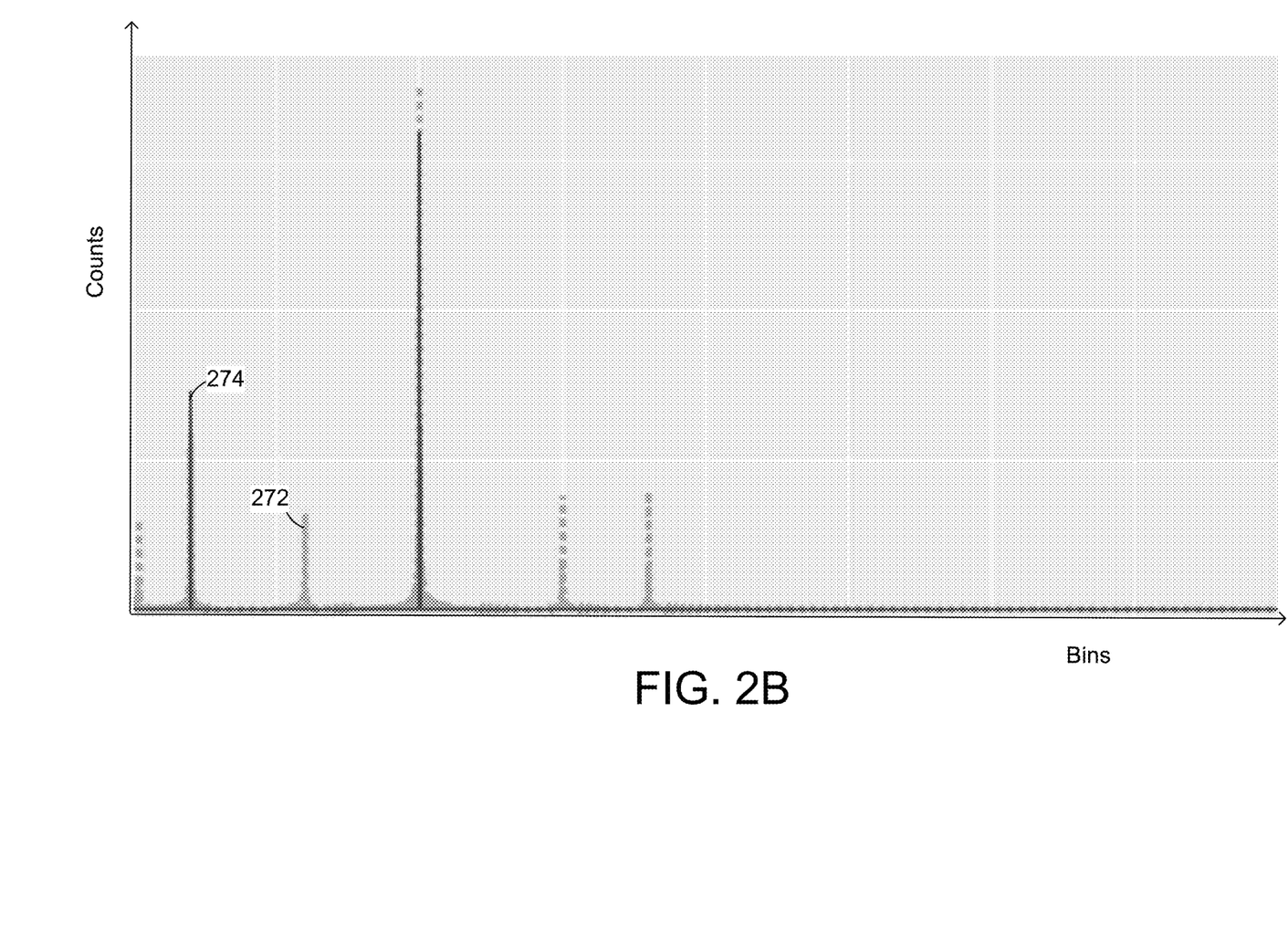
FIG. 2B shows histograms based on the LIDAR data of FIG. 2A, in accordance with one or more example embodiments of the present disclosure.

Still referring to FIG. 2A, the one or more processors 132 may accumulate the sinusoids 203 and generate a compressed signal 220 (e.g., a summation of the sinusoids 203) in a domain incoherent with the signal representation (e.g., signal 201A) domain. The compressed signal 220 may be compressed in comparison to a histogram generated based on the ToF data 201 because a Fourier-based compressed signal recovery method 230 may receive random samples of the compressed signal 220. The one or more processors 132 may apply the Fourier-based compressed signal recovery method 230 to the compressed signal 220 to recover, based on the random samples of the compressed signal 220, frequency values in a spectrum 235. By identifying the most dominant of the sinusoids 203 (e.g., the sinusoids that occur the most times, such as the sinusoids 208 and 210, which may be generated based on a same frequency value of the frequency values 202 corresponding to two same ToF values of the ToF data 201), the one or more processors 132 may determine the spectrum 235 using the individual amplitudes of the sinusoids 203, including the compressed signal 220. For example, the spectrum 235 may include a data point 240 corresponding to the amplitude of the sinusoid 204, and a data point 244 corresponding to the aggregated amplitudes of sinusoids 208 and 210 (e.g., the most energetic data points of the compressed signal 220). In this manner, the number of data points of the spectrum 235 may be less than the number of sinusoids 203 (e.g., and less than the corresponding number of frequency values 202 and ToF data 201), but still results in the identification of the most energetic data points without having to take many more samples of the signal 201A. The fewer data points of the spectrum 235 may, when the data points are de-mapped, result in a less noisy histogram (e.g., when compared to a histogram based on the ToF data 201) as shown in FIG. 2B. For example extracted data 260 from the spectrum 235 may be mapped back to the signal representation domain. The extracted data 260 may represent a point-cloud in which the distance and intensity of LIDAR data at a particular bin (e.g., as shown in the histograms of FIG. 2B) may be determined. For example, the extracted data 260 may include a pair (e.g., X1, Y1) for the most energetic point of a histogram generated based on the extracted data 260 (e.g., as shown in FIG. 2B), a pair (e.g., X2, Y2) for the second most energetic point in the histogram, and so on.

In one or more embodiments, the number of data points in the spectrum 235 as a result of the compressed signal recovery 230 may be based on a most frequent value or N most frequent values of the frequency values 202 (e.g., the most energetic locations on a histogram based on the extracted data 260). For example, the compressed signal recovery 230 may allow for only the most frequently occurring frequency value of the frequency values. When there are ten frequency values, and three of them are the same value, and no other frequency value occurs three or more times, the compressed signal recovery 230 may produce one data point (e.g., one for the three common frequency values). Alternatively, the compressed signal recovery 230 may allow for data points for the N most frequently used frequency values. For example, when N=2, two frequency values are the same as one another, and three other frequency values are the same as one another, the compressed signal recovery 230 may produce two data points (e.g., N data points): a data point for the three matching frequency values, and a data point for the two matching frequency values. Accordingly, the data point(s) shown in the spectrum 235 may represent the data points most likely corresponding to an object whose reflections resulted in the ToF values that resulted in the data points. By de-mapping the data points of the spectrum 235 (e.g., applying the mapping 136 to convert the frequency data of the spectrum 235 to the extracted data 260), the resulting extracted data 260 may include fewer data points than the ToF data 201 (e.g., only the ToF data most likely indicative of an object). The extracted data 260 may be used for object detection to control a vehicle (e.g., the vehicle 102 of FIG. 1).

In one or more embodiments, the Fourier-based compressed signal recovery method 230 may include fast Fourier transform methods such as sparse fast Fourier transform (SFFT), Ann Arbor fast Fourier transform (AAFFT), and others. The Fourier-based compressed signal recovery method 230 may be used to recover the frequency data points of the spectrum 235 based on the random samples of the aggregated sinusoids 203 of the compressed signal 220. Based on the extracted data 260, a histogram may be generated (e.g., as shown in FIG. 2B) to allow for a determination of which LIDAR data indicates the presence of an object, and at what distance.

FIG. 2B shows histograms based on the LIDAR data of FIG. 2A, in accordance with one or more example embodiments of the present disclosure.

In particular and with reference to FIG. 2B, there is shown a histogram 272 and a histogram 274. The histogram 272 represents the actual histogram that is based on the ToF data 201 of FIG. 2A, and the histogram 274 represents a histogram generated using the extracted data 260 FIG. 2A. As shown, the histogram 274 represents a de-noised version of the histogram 272. In this manner, by generating the spectrum 235 from the sparse ToF data 201, the additional data points generated using the process of FIG. 2A may provide a less noisy version of the histogram 272, and therefore may allow for better LIDAR analysis (e.g., determining the distance of objects from the vehicle 102 of FIG. 1).

As shown in FIG. 2B, there are two peaks for the histogram 274 (e.g., the two most energetic points based on the extracted data 260 of FIG. 2A), which represent fewer peaks than the histogram 272 because the histogram 272 (e.g., corresponding to the histogram 201B of FIG. 2A) is based on the ToF data 201 of FIG. 2A before the compressive sensing is applied. Because of the frequency conversion and compressed signal recovery 230 of FIG. 2A, the histogram 274 may show the N data points (e.g., the two peaks as shown) most likely to correspond to the presence of an object. For example, a bin for the histogram 272 or the histogram 274 may represent a number of photon detections within the range (e.g., range of time) specified by the bin. When a LIDAR laser is pulsed (e.g., using the LIDAR 122 of FIG. 1), the sensor system 110 of FIG. 1 may determine (e.g., estimate) the number of photons per pulse (e.g., the count). The peaks of the histogram 274 indicate the number of photons detected per pulses emitted at those respective times. Because the speed of LIDAR pulse emissions is known (e.g., the speed of light), and the times at which high numbers of photons detected per pulses emitted are detectable based on the histogram 274, the sensor system 110 may determine object distance from the sensor system 110 (e.g., the objects whose reflections caused the high number of photons). For example, the LIDAR output may be a point-cloud indicative of range (e.g., distance) information. Based on the object distances, the sensor system 110 may facilitate operational control of the vehicle 102 (e.g., by allowing the vehicle 102 to determine speed, direction, etc. based on the presence of objects). In this manner, the de-noised histogram 274 represents an operational improvement over the noisier histogram 272 due to the compressed signal processing of FIG. 2A.

It is understood that the above descriptions are for purposes of illustration and are not meant to be limiting.

Figure 3:
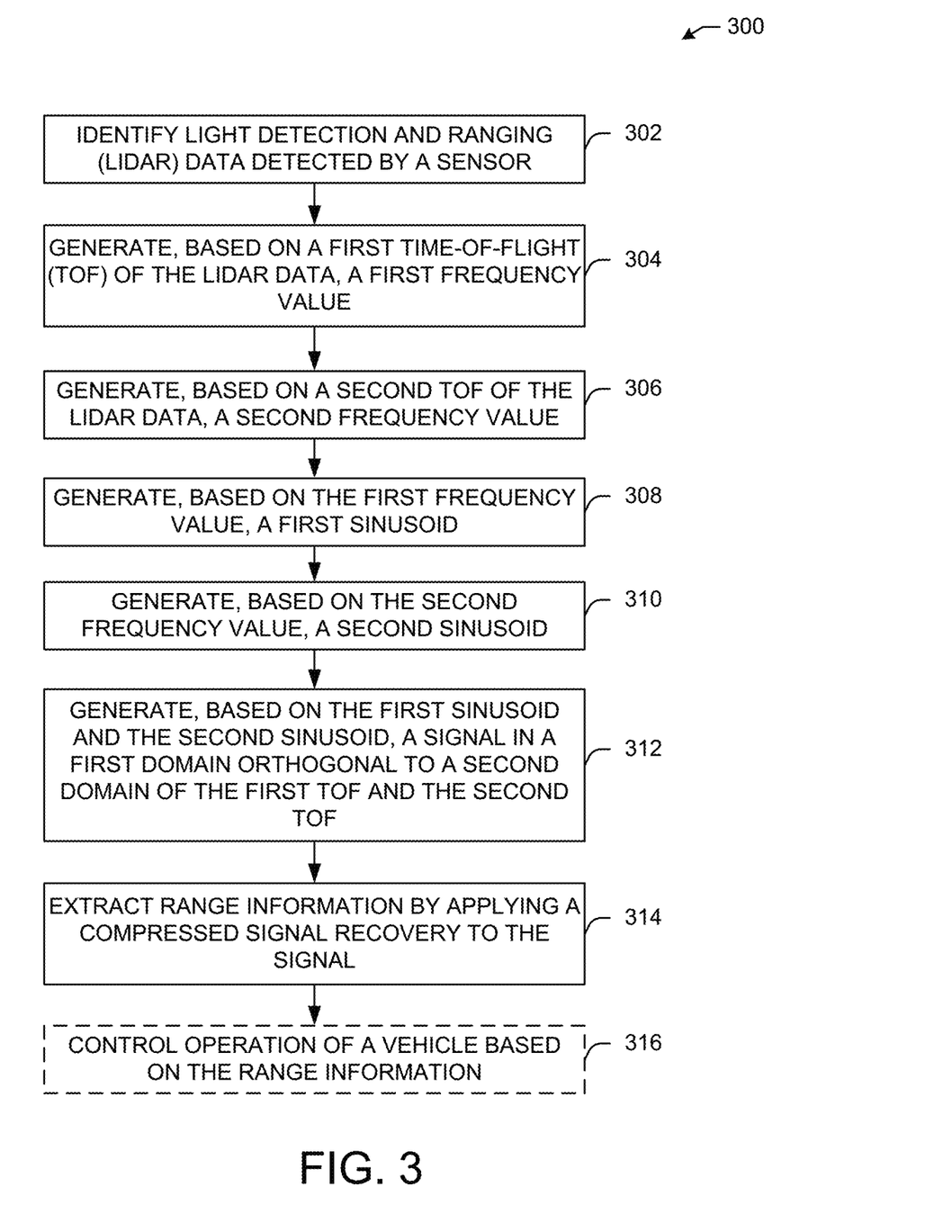
FIG. 3 illustrates a flow diagram of a process for processing LIDAR data, in accordance with one or more example embodiments of the present disclosure.

FIG. 3 illustrates a flow diagram of a process 300 for processing LIDAR data, in accordance with one or more example embodiments of the present disclosure.

At block 302, a system (or device, e.g., the sensor system 110 of FIG. 1) may identify LIDAR data detected by a sensor (e.g., the LIDAR 122 of FIG. 1, which may include an APD or other type of photodiode to detect reflections of LIDAR pulses). The LIDAR data may include the ToFs (e.g., the ToF data of FIG. 2A) of emitted LIDAR pulses—the time between pulse emission and detection of reflections of the emitted pulses. The ToFs may be indicative of the distances that the emitted LIDAR pulses traveled, and therefore the distances to objects off of which the LIDAR pulse reflections (e.g., because velocity=distance/time, and the velocity of the pulses is known).

At block 304, the system may generate a first frequency value based on a first ToF of the LIDAR data. At block 306, the system may generate a second frequency value based on a second ToF of the LIDAR data. The system may generate a respective frequency value for any ToF of the LIDAR data. In this manner, any ToF value (e.g., time value) may map to a corresponding frequency value (e.g., in MHz). The system may use a mapping (e.g., the mapping 136 of FIG. 1) that maps ToF values to frequency values, linearly or non-linearly. For example, a ToF of 5 nanoseconds may correspond to a frequency value of 5 MHz.

At block 308, the system may generate a first sinusoid based on the first frequency value. At block 310, the system may generate a second sinusoid based on the second frequency value. The system may generate a respective sinusoid for any frequency value. For example, using an oscillator capable of generating sinusoids (e.g., the oscillator 134 of FIG. 1), any frequency value as an input to the oscillator may result in the generation of a sinusoidal output (e.g., the sinusoids 203 of FIG. 2A). For example, the oscillator may be a numerical controlled oscillator (NCO) driven by the frequency values to produce a fixed number of samples of respective sinusoids at respective frequencies.

At block 312, the system may generate a compressed signal based on the sinusoids. The sinusoidal signals may be aggregated (e.g., generating a summation of the sinusoids), representing data in a domain incoherent with the time domain of the ToF data. At block 314, the system may extract range (e.g., distance) information from the signal by applying a compressed signal recovery (e.g., the compressed signal recovery 230 of FIG. 2A) to the signal of block 312. Applying a compressed signal recovery to the data in the incoherent domain may result in values indicative of signal amplitude in the frequency domain, but fewer values that the ToF values (e.g., based on a selection of the most N repeated values). In one or more embodiments, the number of data points in the spectrum 235 of FIG. 2A as a result of the compressed signal recovery 230 of FIG. 2A may be based on a most frequent value or N most frequent values of the frequency values 202 of FIG. 2A. For example, the compressed signal recovery 230 may allow for only the most frequently occurring frequency value of the frequency values. When there are ten frequency values, and three of them are the same value, and no other frequency value occurs three or more times, the compressed signal recovery 230 may produce one data point (e.g., one for the three common frequency values). Alternatively, the compressed signal recovery 230 may allow for data points for the N most frequently used frequency values. For example, when N=2, two frequency values are the same as one another, and three other frequency values are the same as one another, the compressed signal recovery 230 may produce two data points (e.g., N data points): a data point for the three matching frequency values, and a data point for the two matching frequency values. Accordingly, the data point(s) shown in the spectrum 235 may represent the data points most likely corresponding to an object whose reflections resulted in the ToF values that resulted in the data points. By de-mapping the data points of the spectrum 235 (e.g., applying the mapping 136 of FIG. 1 to convert the frequency data of the spectrum 235 to the extracted data 260), the extracted data 260 may include fewer data points than the ToF data 201 (e.g., only the ToF data most likely indicative of an object). In this manner, the ToF data 201 may be used for object detection to control a vehicle (e.g., the vehicle 102 of FIG. 1), and the object detection may be more efficient using the enhanced techniques described herein.

At block 314, optionally the system may use the compressed signal to control operation of a vehicle (e.g., the vehicle 102 of FIG. 1) or another machine. For example, the histogram 274 of FIG. 2B shows the number of LIDAR detections over time. A reflecting object (e.g., the object 152 of FIG. 1) may result in a higher peak in the histogram 274. Using the corresponding time for a peak (e.g., a ToF), the system may determine the corresponding distance to a reflecting object. Based on the detection of reflecting objects and their distances from the system, the system may facilitate the operation of a vehicle by causing instructions to be sent to vehicle components to control vehicle speed, direction, and the like.

It is understood that the above descriptions are for purposes of illustration and are not meant to be limiting.

Figure 4:
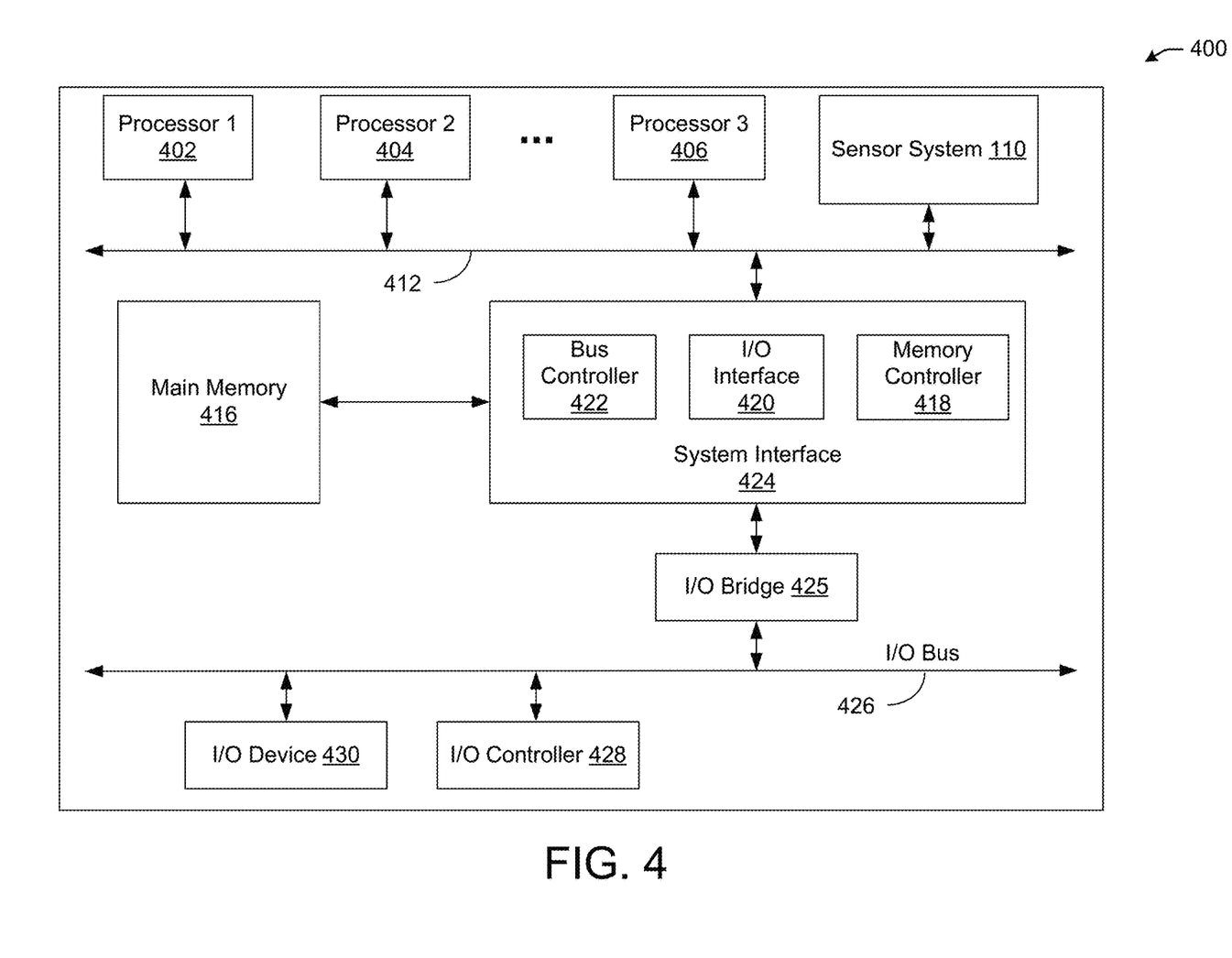
FIG. 4 is a block diagram illustrating an example of a computing device or computer system upon which any of one or more techniques (e.g., methods) may be performed, in accordance with one or more example embodiments of the present disclosure.

FIG. 4 is a block diagram illustrating an example of a computing device or computer system 400 upon which any of one or more techniques (e.g., methods) may be performed, in accordance with one or more example embodiments of the present disclosure.

For example, the computing system 400 of FIG. 4 may represent the sensor system 110 of FIG. 1, and therefore may facilitate the emission, reception, and processing of pulses. The computer system (system) includes one or more processors 402-406. Processors 402-406 may include one or more internal levels of cache (not shown) and a bus controller (e.g., bus controller 422) or bus interface (e.g., I/O interface 420) unit to direct interaction with the processor bus 412. The sensor system 110 of FIG. 1 may also be in communication with the Processors 402-406 and may be connected to the processor bus 412.

Processor bus 412, also known as the host bus or the front side bus, may be used to couple the processors 402-406 and/or the sensor system 110 with the system interface 424. System interface 424 may be connected to the processor bus 412 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices 430 with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406 and/or the sensor system 110. Another type of user input device includes cursor control, such as a mouse, a trackball, or cursor direction keys for communicating direction information and command selections to the processors 402-406 and/or the sensor system 110 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406 and/or the sensor system 110. Main memory 416 also may be used for storing temporary variables or other intermediate information during execution of instructions by the processors 402-406 and/or the sensor system 110. System 400 may include read-only memory (ROM) and/or other static storage device coupled to the processor bus 412 for storing static information and instructions for the processors 402-406 and/or the sensor system 110. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 and/or the sensor system 110 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device for processing light detecting and ranging (LIDAR) signal data, the device comprising memory coupled to at least one processor configured to:

receive LIDAR data detected by a sensor, the LIDAR data comprising a first time-of-flight (ToF) and a second ToF;
generate, based on a first frequency value, a first sinusoid, the first frequency value based on the first ToF;
generate, based on a second frequency value, a second sinusoid, the second frequency value based on the second ToF;
generate, based on the first sinusoid and the second sinusoid, a signal in a first domain incoherent from a second domain associated with the first ToF and the second ToF;
extract range information by applying a compressed signal recovery to the signal; and
control operation of a vehicle based on the range information.

2. The device of claim 1, wherein the at least one processor is further configured to:
generate a summation of the first sinusoid and the second sinusoid,
wherein to generate the signal is based on random sampling of the summation of the first sinusoid and the second sinusoid.

3. The device of claim 1, wherein the LIDAR data comprises a first number of data points comprising the first ToF and the second ToF, and wherein the processor is further configured to generate the signal in the first domain based on a second number of data points less than the first number of data points.

4. The device of claim 1, wherein the first ToF is different than the second ToF.

5. The device of claim 1, wherein the first ToF is the same as the second ToF.

6. The device of claim 1, wherein the first sinusoid and the second sinusoid are in a time domain.

7. The device of claim 1, wherein the at least one processor is further configured to generate, using a mapping between ToF data and frequency data, the first frequency value by mapping the first ToF to the first frequency value.

8. The device of claim 7, wherein the mapping is linear.

9. The device of claim 1, wherein the LIDAR data comprises first ToF data comprising the first ToF and the second ToF, wherein the processor is further configured to extract the range information based on second ToF data associated with the signal, and wherein the first ToF data include more noise than the second ToF data.

10. A vehicle light detection and ranging (LIDAR) system comprising:
a LIDAR emitter configured to emit LIDAR pulses;
a photodiode configured to detect LIDAR data based on the LIDAR pulses;
an oscillator configured to generate sinusoids; and
memory coupled to at least one processor, the at least one processor configured to:
receive LIDAR data detected by the photodiode, the LIDAR data comprising a first time-of-flight (ToF) and a second ToF;
generate, based on the first ToF, a first frequency value;
generate, based on the second ToF, a second frequency value;
receive a first sinusoid generated by the oscillator based on the first frequency value;
receive a second sinusoid generated by the oscillator based on the second frequency value;
generate, based on the first sinusoid and the second sinusoid, a signal in a first domain incoherent with a second domain associated with the first ToF and the second ToF;
extract range information by applying a compressed signal recovery to the signal; and
control operation of a vehicle based on the range information.

11. The vehicle LIDAR system of claim 10, wherein the at least one processor is further configured to:
generate a summation of the first sinusoid and the second sinusoid,
wherein to generate the signal is based on random sampling of the summation of the first sinusoid and the second sinusoid.

12. The vehicle LIDAR system of claim 11, wherein the LIDAR data comprises a first number of data points comprising the first ToF and the second ToF, and wherein the at least one processor is further configured to generate the signal in the first domain based on a second number of data points less than the first number of data points.

13. The vehicle LIDAR system of claim 10, wherein the first sinusoid and the second sinusoid are in a time domain.

14. The vehicle LIDAR system of claim 10, wherein to generate the first frequency value comprises to map, using a mapping between ToF data and frequency data, the first ToF to the first frequency value.

15. The vehicle LIDAR system of claim 10, wherein the LIDAR data comprises first ToF data comprising the first ToF and the second ToF, wherein the at least one processor is further configured to extract the range information based on second ToF data associated with the signal, and wherein the first ToF data include with more noise than the second ToF data.

16. The vehicle LIDAR system of claim 10, wherein the oscillator is a numerical controlled oscillator, and wherein the photodiode is a Geiger mode avalanche photodiode.

17. A method for processing light detection and ranging (LIDAR) signals, the method comprising:
receiving, by at least one processor, light detecting and ranging (LIDAR) data detected by a sensor, the LIDAR data comprising a first time-of-flight (ToF) and a second ToF of the LIDAR data;
generating, using an oscillator, based a first frequency value, a first sinusoid, the first frequency value based on the first ToF;
generating, using the oscillator, based a second frequency value, a second sinusoid, the second frequency value based on the second ToF;
generating, by the at least one processor, based on the first sinusoid and the second sinusoid, a signal in a first domain incoherent with a second domain associated with the first ToF and the second ToF;
extracting, by the at least one processor, range information by applying a compressed signal recovery to the signal; and
controlling, by the at least one processor, operation of a vehicle based on the range information.

18. The method of claim 17, further comprising:
generating a summation of the first sinusoid and the second sinusoid,
wherein generating the signal is based on random sampling of the summation of the first sinusoid and the second sinusoid.

19. The method of claim 18, wherein the LIDAR data comprises a first number of data points comprising the first ToF and the second ToF, and wherein generating the signal by the at least one processor comprises generating a second number of data points less than the first number of data points.

20. The method of claim 17, wherein controlling operation of the vehicle comprises:
   identifying an object based on the range information; and
   causing the vehicle to operate at a vehicle speed based on the object.

* * * * *